United States Patent [19]

Sasaki et al.

[11] Patent Number: 4,859,727
[45] Date of Patent: Aug. 22, 1989

[54] ANTISTATIC THERMOPLASTIC RESIN COMPOSITION

[75] Inventors: Isao Sasaki; Naoki Yamamoto, both of Saeki; Akira Yanagase; Hiroki Hatakeyama, both of Otake, all of Japan

[73] Assignee: Mitsubishi Rayon Company Ltd., Tokyo, Japan

[21] Appl. No.: 87,524

[22] Filed: Aug. 20, 1987

[30] Foreign Application Priority Data

Aug. 22, 1986 [JP] Japan .................. 61-196857
Aug. 22, 1986 [JP] Japan .................. 61-196858
Sep. 4, 1986 [JP] Japan .................. 61-208494

[51] Int. Cl.$^4$ .................. C08K 5/51; C08L 33/14
[52] U.S. Cl. .................. 524/147; 524/153; 525/197; 525/212; 525/217; 525/223; 525/77; 526/287; 526/292.2; 526/312; 526/320
[58] Field of Search .................. 525/77, 217, 197, 212, 525/223; 524/147, 153

[56] References Cited

U.S. PATENT DOCUMENTS

| | | | |
|---|---|---|---|
| 3,385,839 | 5/1968 | Honig et al. | 526/304 |
| 3,823,204 | 7/1974 | Okada | 525/217 |
| 3,868,432 | 2/1975 | Keegan | 525/217 |
| 4,039,634 | 8/1977 | Couchoud | 525/217 |
| 4,299,748 | 11/1981 | Hashizume | 525/217 |
| 4,384,078 | 5/1983 | Ohya | 525/77 |
| 4,526,918 | 7/1985 | Burton | 524/152 |

FOREIGN PATENT DOCUMENTS 45-21892 7/1970 Japan .
47-40313 10/1974 Japan .
59-39736 9/1984 Japan .

Primary Examiner—John C. Bleutge
Assistant Examiner—David Buttner
Attorney, Agent, or Firm—Oblon, Spivak, McClelland, Maier & Neustadt

[57] ABSTRACT

Disclosed is an antistatic thermoplastic resin composition which comprises a thermoplastic resin and a minor amount of an antistatic property-imparting material which is a polymer comprising 20 to 100 weight % of units of a monomer having a quaternary ammonium base represented by the formula (I):

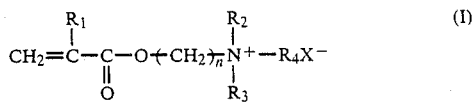

wherein $R_1$ represents hydrogen or methyl, $R_2$ through $R_4$ represent hydrogen or (C1-9) alkyl, which may have a substituent, n is a number of 1 to 10, and $X^-$ represents a monovalent acid group or a corresponding equivalent of an acid, and up to 80 weight % of units of a copolymerizable vinyl or vinylidene monomer.

8 Claims, No Drawings

ANTISTATIC THERMOPLASTIC RESIN COMPOSITION

BACKGROUND OF THE INVENTION (1) Field of the Invention

The present invention relates to a thermoplastic resin composition having a good and permanent antistatic property.

(2) Description of the Related Art

Generally, plastics have a large electric resistance and have problems in that they are readily electrically charged by friction or on peeling and attract dust, thus spoiling the appearance thereof. Accordingly, various problems arise in the fields of molded articles, films, sheets and fibers prepared from plastics.

Ordinarily, the following methods are adopted for imparting an antistatic property to plastics.

(1) A method in which an antistatic agent is kneaded into a plastic material.

(2) A method in which an antistatic agent is coated on the surface of a plastic article.

Furthermore, there can be mentioned a method in which a silicon compound is coated on the surface of a plastic article, and a method in which the surface structure of a plastic article is modified by a plasma treatment, but these methods are expensive.

In the method in which an antistatic agent is kneaded into a plastic material, a surface active agent having a low molecular weight is ordinarily used as the antistatic agent. According to this method, however, it is difficult to impart a permanent antistatic property. Namely, if the antistatic agent present on the surface is removed by water washing, friction or the like, the antistatic property is lost. Moreover, there can be mentioned a method using an antistatic rubber, as proposed in Japanese Unexamined Patent Publication No. 55-36237. However, in this method, the antistatic rubber must be incorporated in a large amount and the inherent physical properties of plastics, such as heat resistance, are degraded, and the surface resistance is still about $10^{11}$ $\Omega$ and is not good.

According to the surface coating method with an antistatic agent, a good antistatic property can be attained such that the surface resistance is about $10^9$ $\Omega$. However, the antistatic property is easily lost by water washing, friction or the like. Furthermore, this method is disadvantageous over the kneading method in that the surface coating step is necessary and the cost is increased.

Recently, there is a demand for an antistatic material having a high reliability, for a delivery container or as packaging material for electronic parts. However, an antistatic agent has not been provided which can impart a good and permanent antistatic property with a small incorporated amount without any particular step as described above and does not degrade the inherent properties of a base polymer, and thus the development of such an antistatic agent is eagerly desired in the art.

SUMMARY OF THE INVENTION

It is a primary object of the present invention to provide a thermoplastic resin composition in which a good and permanent antistatic property is manifested without a substantial reduction of the physical properties such as heat resistance and strength of a base polymer.

More specifically, in accordance with the present invention, there is provided an antistatic thermoplastic resin composition which comprises (A) 100 parts by weight of a thermoplastic resin and (B) 0.1 to 40 parts by weight of a polymer comprising 20 to 100% by weight of units of a monomer having a quaternary ammonium base, which is represented by the following general formula (I):

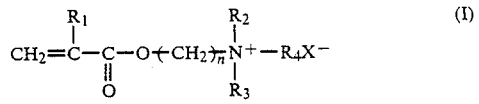

wherein $R_1$ represents a hydrogen atom or a group, $R_2$ through $R_4$ represent a hydrogen atom or an alkyl group having 1 to 9 carbon atoms, which may have a substituent, n is a number of from 1 to 10, and $X^-$ represents a monovalent inorganic or organic acid group or a corresponding equivalent an inorganic or organic acid, and up to 80% by weight of units of a vinyl monomer or vinylidene monomer copolymerizable therewith.

DESCRIPTION OF THE PREFERRED EMBODIMENTS

As the thermoplastic resin (A) used as the base polymer in the present invention, there can be mentioned (a) homopolymers and copolymers of at least one ethylenically unsaturated monomer, for example, polyolefins such as polyethylene, polypropylene and polymethylpentene, and homopolymers and copolymers of a vinyl monomer or acrylic monomer, for example, polyvinyl chloride, polyvinyl acetate, an ethylene/vinyl acetate copolymer, an ethylene/ethyl acrylate copolymer, an ethylenic ionomer, a methyl methacrylate polymer, polystyrene, a styrene/acrylonitrile copolymer, a styrene/alkyl methacrylate or alkyl acrylate copolymer, rubber-modified polystyrene, an ABS resin, an MBS resin and an AAS resin, (b) polymers of at least one bifunctional reactive compound polymerizable by self-condensation, for example, polyoxymethylene, a polyacetal copolymer polyphenylene ether, a PPS resin, polycaprolactam and polytcaproactone, and (c) polymers of at least two bifunctional reactive compounds polymerizable by polycondensation, for example, nylon 66, polysulfone, polyesters, such as polyethylene terephthalate and polybutylene terephthalate, polyester-polyether block copolymers, polyester-polyamide block copolymers, polyimides, wholly aromatic polyesters, polycarbonates, polyether-ether-ketones and polyurethane elastomers. These polymers may be used singly or in the form of mixtures of two or more thereof.

Among these polymers, polystyrene, a styrene/acrylonitrile copolymer, an ABS resin, a methyl methacrylate polymer and polyvinyl chloride are preferably used.

In the thermoplastic resin (A) used in the present invention, a comonomer is ordinarily introduced to improve the physical properties such as moldability and heat resistance. For example, a methyl methacrylate polymer used in the present invention is a polymer comprising 50 to 100% by weight of units of methyl methacrylate and up to 50% by weight of units of another copolymerizable monomer. As the monomer copolymerizable with methyl methacrylate, there can be mentioned other alkyl methacrylates such as ethyl methacrylate, butyl methacrylate and 2-ethylhexyl methacrylate, alkyl acrylates such as methyl acrylate, ethyl acrylate, butyl acrylate and 2-ethylhexyl acrylate, and styrene, acrylonitrile, methacrylic acid, acrylic acid, itaconic acid, maleic acid, fumaric acid and vinyltoluene. Alkyl acrylates such as methyl acrylate and styrene are preferably used. Note, the thermoplastic resin (A) used in the present invention is not limited in any way by these comonomer components.

The units of the monomer having a quaternary ammonium base as the constituent of the polymer (B) imparting an antistatic property are represented by the following general formula (I):

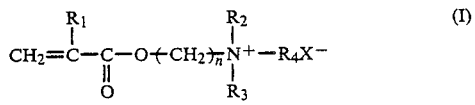

where $R_1$ through $R_4$, n and $X^-$ are as defined above. This quaternary ammonium base is formed by quaternizing an amine-containing acrylate or methacrylate by a quaternizing agent.

As specific examples of the amine-containing acrylate or methacrylate, there can be mentioned dimethylaminoethyl acrylate, diethylaminoethyl acrylate, dimethylaminoethyl methacrylate, diethylaminoethyl methacrylate, dimethylaminopropyl methacrylate, dimethylaminobutyl methacrylate, dipropylaminoethyl methacrylate, dibutylaminoethyl methacrylate and dihydroxyethylaminoethyl methacrylate.

As the quaternizing agent, there can be mentioned alkyl sulfates such as dimethyl sulfate, diethyl sulfate and dipropyl sulfate, sulfonic acid esters such as methyl p-toluenesulfonate and methyl benzenesulfonate, alkyl sulfites such as dimethyl sulfite, alkyl phosphates such as trimethyl phosphate, and halides such as alkylbenzyl chloride, benzyl chloride, alkyl chloride and alkyl bromide. In view of the resistance to thermal decomposition, alkyl sulfates and sulfonic acid esters are preferred.

In the general formula (I), n is a number of from 1 to 10, preferably from 2 to 6. The counter anion $X^-$ of the quaternary ammonium base in the general formula (I) is $RSO_3^-$ or $ROSO_3^-$ in which R represents a hydrogen atom or an alkyl group having 1 to 20 carbon atoms, which may have a phenyl group.

The antistatic property-imparting polymer (B) used in the present invention comprises 20 to 100% by weight of units of a monomer having a quaternary ammonium base, which is represented by the formula (I), and up to 80% by weight of units of a vinyl or vinylidene monomer copolymerizable therewith. If the content of the monomer (I) having a quaternary ammonium base in the polymer (B) is smaller than 20% by weight, it is impossible to impart a good antistatic property to the thermoplastic resin (A).

A preferable antistatic property-imparting polymer (B) is a homopolymer composed solely of units of the monomer having a quaternary ammonium base, which is represented by the general formula (I), or a copolymer comprising 30 to 99% by weight of units of the monomer having a quaternary ammonium base, which is represented by the general formula (I), and 1 to 70% by weight of units of the vinyl monomer or vinylidene monomer copolymerizable therewith.

As the copolymerizable vinyl or vinylidene monomer, there can be mentioned acrylic acid, methacrylic acid, alkyl acrylates, alkyl methacrylates, acrylamide, methacrylamide, vinyl acetate, unsaturated nitrile compounds, aromatic vinyl compounds, alkyl vinyl ethers, alkyl vinyl ketones, 2-hydroxyalkyl acrylates, 2-hydroxyalkyl methacrylates, vinyl chloride, vinylidene chloride, isobutene, 2-acid-phosphoxyethyl acrylate and 2-acid-phosphoxyethyl methacrylate. These monomers may be used singly or in the form of mixtures of two or more thereof.

If a monomer having a high polarity, such as acrylonitrile, or a monomer containing an ionic substituent such as a sulfonic acid group, a phosphoric acid group or a carboxylic acid group is used as the copolymerizable monomer, the antistatic property is further improved. Accordingly, use of such a monomer is preferred. Especially, when a monomer which is the same as the monomer constituting the thermoplastic resin (A) as the base polymer or a monomer which is capable of forming a resin having a good compatibility with the thermoplastic resin (A) is used as the copolymerizable monomer, the physical properties such as strength and transparency of the base polymer can be advantageously maintained at high levels.

A monomer having a polyalkylene glycol component is especially preferred as the comonomer in the present invention. This monomer exerts an effect of improving the antistatic property without reduction of the physical properties such as strength and transparency in many thermoplastic resis (A), and if the thermoplastic resin (A) is a methyl methacrylate polymer, a thermoplastic resin composition having a particularly superior antistatic property and transparency is obtained having a polyalkylene.

As the copolymerizable monomer glycol component, that is used in the present invention, there can be used a styryl-terminated polyalkylene glycol macromer and a vinyl-terminated polyalkylene glycol macromer, and an especially preferred monomer is represented by the following general formula (II):

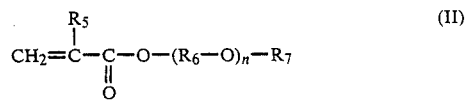

wherein $R_5$ represents a hydrogen atom or a methyl group, $R_6$ represents an alkylene group having up to 4 carbon atoms, which may be branched, $R_7$ represents a hydrogen atom or an alkyl group having 1 to 20 carbon atoms and n is an integer of from 1 to 500. This monomer is a methacrylate- or acrylate-terminated polyalkylene glycol macromer. For example, there can be mentioned polyethylene glycol(4) monomethacrylate, polyethylene glycol(23) monomethacrylate, polyethylene glycol(300) monomethacrylate, polyethylene glycol(23) monoacrylate, polypropylene glycol(23) monomethacrylate, polypropylene glycol(23) monoacrylate, polyethylene glycol(23) monomethacrylate monomethyl ether, polyethylene glycol(23) monomethacrylate monobutyl ether, polypropylene glycol(23) monoacrylate monomethyl ether, polyethylene glycol(23) monomethacrylate monononyl ether, polyethylene glycol(23) monomethacrylate monostearyl ether, polypropylene glycol(23) monomethacrylate monomethyl ether, polyethylene glycol(4) monomethacrylate monomethyl ether, polyethylene glycol(9) monomethacrylate monomethyl ether, polyethylene glycol(300) monomethacrylate monomethyl ether and polyethylene glycol(23) monomethacrylate mono-oleyl ether (each parenthesized value indicates the number of units in the polyalkylene glycol).

Where the thermoplastic resin (A) is a methyl methacrylate polymer, the polymer (B) is preferably a copolymer comprising 20 to 90% by weight of a monomer having a quaternary ammonium base, which is represented by the general formula (I), 10 to 80% by weight of a copolymerizable monomer having a polyalkylene glycol component and up to 70% by weight of a copolymerizable vinyl or vinylidene monomer, and a copolymer comprising 30 to 80% by weight of a monomer having a quaternary ammonium base, which is represented by the general formula (I), 20 to 70% by weight of a copolymerizable monomer having a polyalkylene glycol component and up to 50% by weight of a polymerizable vinyl or vinylidene monomer is especially preferred. If the content of the monomer having a polyalkylene glycol component in the copolymer (B) is lower than 10% by weight, the transparency of the resulting resin composition is degraded.

If the copolymerizable vinyl or vinylidene monomer as the third component is a component having a good compatibility with a methyl methacrylate polymer, even when the content of the monomer having a polyalkylene glycol component is reduced, the transparency of the resulting resin composition can be maintained at a high level. Where the copolymerizable vinyl or vinylidene monomer is a monomer having a high polarity, even if the content of the monomer having a quaternary ammonium base is reduced, the antistatic property of the resulting resin composition can be maintained at a high level.

Where the thermoplastic resin (A) is a methyl methacrylate polymer, preferably the weight ratio of units of a monomer of the formula (I) having a quaternary ammonium base to units of a monomer of the formula (II) having a polyalkylene glycol component in the copolymer (B) is from $\frac{1}{4}$ to 4/1, especially from $\frac{1}{2}$ to 2/1. An optimum value of this ratio greatly changes according to the kinds of the monomers represented by the formulae (I) and (II) and the kinds and amounts of the vinyl and vinylidene monomers other than the monomers represented by the formulae (I) and (II). If the above mentioned weight ratio is larger than 4, the transparency is often degraded, and if the above-mentioned ratio is smaller than $\frac{1}{4}$, the antistatic property is often degraded.

The process for the preparation of the polymer (B) is not particularly critical. Ordinarily, solution polymerization or bulk polymerization conducted in the presence of a radical initiator and a chain transfer agent can be adopted. However, solution polymerization is preferred because polymerization can be carried out in a homogeneous system. In the case of solution polymerization, various monomer addition means such as collective addition, divided addition and dropping addition can be adopted.

Preferably the molecular weight of the polymer (B) is at least 1,000. If the molecular weight of the polymer (B) is lower than 1,000, often a good and permanent antistatic property cannot be obtained, and by the plasticizing effect, the heat resistance of the thermoplastic resin in which the polymer (B) is incorporated is often degraded.

The polymer (B) is incorporated in an amount of 0.1 to 40 parts by weight, preferably 0.5 to 40 parts by weight, per 100 parts by weight of the thermoplastic resin (A). If the amount of the polymer (B) added is smaller than 0.1 part by weight, a good antistatic property cannot be imparted, and if the amount of the polymer (B) exceeds 40 parts by weight, the inherent physical properties of the thermoplastic resin (A) as the base polymer are drastically degraded and the cost is increased. It is ordinarily sufficient if the polymer (B) is incorporated in an amount of about 2 to about 6 parts by weight, and by addition of such an amount of the polymer (B), a surface resistance value of $10^9$ to $10^{12}$ Ω is attained.

Various methods can be adopted for mixing the thermoplastic resin (A) with the polymer (B). For example, there can be mentioned a method in which the monomers constituting the thermoplastic resin (A) are polymerized in the presence of the polymer (B), and a method in which the thermoplastic resin (A) is mixed with the polymer (B) in a hot molten state. The latter method is preferable.

Various molding methods such as injection molding, extrusion molding and press molding can be adopted for molding the resin composition of the present invention having an excellent antistatic property.

The reason why a good antistatic property is manifested in the thermoplastic resin composition of the present invention is that, by dint of peculiar properties of the polymer (B) containing a quaternary ammonium base, which is used in the present invention, at the step of molding the composition of the present invention, for example, at the injection molding step or extrusion shaping step, the polymer (B) is concentrated or oriented on the surface of a molded article. Moreover, since this quaternary ammonium base-containing polymer (B) is a polymer, even if a molded article of the thermoplastic resin composition of the present invention is washed with water, there is little or no isolation of the polymer (B), and a permanent antistatic property can be imparted. Furthermore, since a balance between compatibility and uncompatibility with the base polymer can be easily kept, a good antistatic property can be manifested without reduction of various inherent properties of the resin.

Other antistatic agent, a lubricant, an antioxidant, an ultraviolet absorbent and other additives can be incorporated in the thermoplastic resin composition of the present invention. Note, since the quaternary ammonium base in the polymer (B) is easily oxidized, preferably a phosphite antioxidant is incorporated.

The thermoplastic resin composition of the present invention has a good and permanent antistatic property, and inherent properties, such as heat resistance and strength, of the base polymer are not degraded. Accordingly, the occurrence of static charging problems caused by an attraction of dust and the like, such as spoilage of the appearance, in the fields of molded articles, films, sheets and fibers can be prevented. Furthermore, the thermoplastic resin composition of the present invention can be advantageously applied in fields where a high reliability is required, for example, in the field of electronic parts and the like.

The present invention will now be described in detail with reference to the following examples. In the examples and comparative examples, all of "parts" are by weight, and the treatment conditions and evaluation conditions adopted are as described below.

Moisture Conditioning

Pellets were molded into a plate 10 cm×10 cm×2 mm by injection molding, and the plate was allowed to stand at a temperature of 23° C. and a relative humidity of 65% for 1 day to effect moisture conditioning.

Water-Washing Treatment

A measurement test piece was subjected to ultrasonic washing at 30° C. for 30 minutes.

Surface Resistance

By using a high megohm meter, namely megger, (Model TR-8601 supplied by Takeda-Riken), a voltage of 500 V was imposed at a temperature of 23° C. and a relative humidity of 65%, and after 1 minute, the surface resistance ($\Omega$) was measured.

Charge Half Life

By using a static honest meter (supplied by Shishido Shokai), the measurement was carried out under an imposed voltage of 10,000V at a sample rotation speed of 1,300 rpm, a temperature of 23° C. and a relative humidity of 65% for a voltage-application time of 30 seconds. The time (seconds) required for reducing the sample voltage after the imposition of the voltage to $\frac{1}{2}$ of the initial sample voltage at the imposition of the voltage was measured as the charge half life. The charge half life of at least 2 minutes is expressed by $\infty$.

Heat Distortion Temperature (HDT)

A test piece for the measurement of HDT was prepared according to ASTM D648, and the test piece was annealed and the HDT (°C.) was measured according to ASTM D648.

Tensile Test

The tensile test was carried out according ASTM D638, and the tensile modulus and tensile strength at break were measured.

Surface Condition

The presence or absence of silver streaks was checked. Mark "A" indicates that no silver streaks were observed and mark "B" indicates that slight silver streaks were observed.

Transparency

The haze was measured by using an integrating sphere haze meter (Model SEP-H-SS supplied by Nippon Seimitsu Kogaku)

EXAMPLE 1

A 3-liter glass flask equipped with stirring vanes was charged with 374 parts of diethylaminoethyl methacrylate, 4 parts of hydroquinone monomethyl ether and 450 parts of methanol, and a mixture of 252 parts of dimethyl sulfate and 80 parts of methanol was dropped into the flask with violent stirring so that the temperature of the resulting mixture was below 30° C. After termination of the dropwise addition, the mixture was stirred for 30 minutes to obtain a solution (M-1) of a quaternary ammonium base-containing monomer. To the solution (M-1) were added 6 parts of azobisisobutyronitrile, 4 parts of n-octylmercaptan, 150 parts of styrene and 480 parts of N,N-dimethylformamide, and polymerization was carried out at 60° C. for 4 hours in a nitrogen atmosphere. After the polymerization, the reaction mixture was directly dried in vacuum to obtain an antistatic property-imparting polymer (T-1).

Then, 5 parts of the so-obtained antistatic property-imparting polymer (T-1) and 0.05 part of triphenyl phosphite were incorporated into 100 parts of a polystyrene resin, and the mixture was pelletized by a melt extruder.

The obtained pellets were injection-molded into a plate 10 cm×10 cm×2 mm, and after moisture conditioning, the antistatic property was evaluated. It was found that the surface resistance was $5\times10^{11}$ $\Omega$ and the charge half life was 2 seconds.

The obtained plate was subjected to the waterwashing treatment and the antistatic property was immediately evaluated. It was found that the surface resistance was $3.7\times10^{11}$ $\Omega$ and the charge half life was 2 seconds.

The HDT was measured and was found to be 92° C. The tensile test was carried out and it was found that the tensile modulus was $3.1\times10^4$ kg/cm² and the tensile strength at break was 430 kg/cm².

EXAMPLE 2

A 3-liter glass flask equipped with stirring vanes was charged with 374 parts of diethylaminoethyl methacrylate, 4 parts of hydroquinone monomethyl ether and 450 parts of methanol, and a mixture of 252 parts of dimethyl sulfate and 80 parts of methanol was dropped into the flask with violent stirring so that the temperature of the resulting mixture was below 30° C. After termination of the dropwise addition, the mixture was stirred for 30 minutes, and 6 parts of azobisisobutyronitrile and 4 parts of n-octylmercaptan were added and polymerization was carried out at 60° C. for 4 hours in a nitrogen atmosphere. After the polymerization, the reaction mixture was dried in vacuum to obtain an antistatic property-imparting polymer (T-2).

Then, 2 parts of the obtained antistatic property-imparting polymer (T-2) and 0.05 part of triphenyl phosphite were incorporated into 100 parts of a polystyrene resin, and the mixture was pelletized by a melt extruder.

The obtained pellets were injection-molded into a plate 10 cm×10 cm×2 mm, and after moisture conditioning, the antistatic property was evaluated. It was found that the surface resistance was $8\times10^{11}$ $\Omega$ and the charge half life was 2 seconds.

The obtained plate was subjected to the waterwashing treatment and the antistatic property was immediately evaluated. It was found that the surface resistance was $3.5\times10^{11}$ $\Omega$ and the charge half value was 2 seconds.

The HDT was measured and was found to be 92° C. The tensile test was carried out and it was found that the tensile modulus was $2.7\times10^4$ kg/cm² and the tensile strength at break was 360 kg/cm².

EXAMPLE 3

A 3-liter glass flask equipped with stirring vanes was charged with 374 parts of diethylaminoethyl methacrylate, 4 parts of hydroquinone monomethyl ether and 450 parts of methanol, and a mixture of 252 parts of dimethyl sulfate and 80 parts of methanol was dropped into flask with stirring so that the temperature of the resulting mixture was below 30° C. After termination of the dropwise addition, stirring was continued for 30 minutes to obtain a solution (M-1) of a monomer having a quaternary ammonium base. To the solution (M-1) were 6 parts of azobisisobutyronitrile, 4 parts of n-octylmercaptan, 480 parts of methanol and 620 parts of polyethylene glycol(23) monomethacrylate monomethyl ether, and polymerization was carried out at 60° C. for 4 hours in a nitrogen atmosphere. After the polymerization, the reaction mixture was directly dried in vacuum to obtain an antistatic property-imparting polymer (T-3).

Then, 6 parts of the obtained antistatic property imparting polymer (T-3) was incorporated into 100 parts of a methacrylic resin (methyl methacrylate/methyl acrylate copolymer supplied under tradename of Acrypet VH by Mitsubishi Rayon; the "methacrylic resin" mentioned hereinafter is this copolymer unless otherwise indicated). The mixture was pelletized at 230° C. by a 40 mm extruder.

The obtained pellets were injection-molded into a plate 10 cm × 10 cm × 2 mm at a cylinder temperature of 250° C. and a mold temperature of 60° C., and moisture conditioning was carried out at a temperature of 23° C. and a relative humidity of 65% for 1 day. Then, the antistatic property and transparency were evaluated. It was found that the surface resistance was $2.0 \times 10^{10}\ \Omega$, the charge half life was 1 second and the haze was 1.5%.

The obtained plate was subjected to the water-washing treatment and the antistatic property was evaluated. It was found that the surface resistance was $1.5 \times 10^{10}\ \Omega$ and the charge half life was shorter than 1 second.

The HDT was measured and was found to be 100° C. The tensile test was carried out and it was found that the tensile modulus was $3.1 \times 10^4$ kg/cm$^2$ and the tensile strength at break was 710 kg/cm$^2$.

EXAMPLES 4 through 7

The antistatic property-imparting polymer (T-1) obtained in Example 1 was incorporated in an amount shown in Table 1 into 100 parts of a polystyrene resin, and the mixture was pelletized by a melt extruder.

The physical properties of the obtained pellets were evaluated according to the methods described above. The obtained results are shown in Table 1.

TABLE 1

| Example No. | Amount of antistatic property-imparting polymer (T-1) (parts) | Surface resistance (Ω) | Charge half life (seconds) | Surface resistance (Ω) after water-washing treatment (Ω) | HDT (°C.) | Tensile modulus (kg/cm$^2$) | Tensile strength at break (kg/cm$^2$) |
|---|---|---|---|---|---|---|---|
| 4 | 0.3 | $6.3 \times 10^{14}$ | 31.5 | $5.3 \times 10^{14}$ | 92 | $3.4 \times 10^4$ | 480 |
| 5 | 1 | $8.2 \times 10^{13}$ | 20.3 | $5.8 \times 10^{13}$ | 92 | $3.4 \times 10^4$ | 480 |
| 6 | 12 | $2.3 \times 10^9$ | <1 | $1.2 \times 10^9$ | 92 | $2.9 \times 10^4$ | 420 |
| 7 | 40 | $<10^9$ | <1 | $3.3 \times 10^8$ | 91 | $2.8 \times 10^4$ | 400 |

EXAMPLES 8 through 12

The antistatic property-imparting polymer (T-2) obtained in Example 2 was incorporated in an amount shown in Table 2 into 100 parts of a polystyrene resin, and the mixture was pelletized by a melt extruder.

The physical properties of the obtained pellets were evaluated according to the methods described above. The results are shown in Table 2.

TABLE 2

| Example No. | Amount of antistatic property-imparting polymer (T-2) (parts) | Surface resistance (Ω) | Charge half life (seconds) | Surface resistance (Ω) after water-washing treatment (Ω) | HDT (°C.) | Tensile modulus (kg/cm$^2$) | Tensile strength at break (kg/cm$^2$) | Surface condition |
|---|---|---|---|---|---|---|---|---|
| 8 | 0.3 | $1.3 \times 10^{14}$ | ∞ | $9.8 \times 10^{13}$ | 92 | $3.4 \times 10^4$ | 480 | A |
| 9 | 1 | $2.3 \times 10^{13}$ | 10.3 | $8.7 \times 10^{12}$ | 92 | $3.1 \times 10^4$ | 410 | A |
| 10 | 5 | $4.3 \times 10^9$ | <1 | $1.2 \times 10^9$ | 92 | $2.5 \times 10^4$ | 320 | A |
| 11 | 12 | $<10^9$ | <1 | $<10^9$ | 92 | $2.2 \times 10^4$ | 270 | A |
| 12 | 40 | $<10^9$ | <9 | $<10^9$ | 91 | $2 \times 10^4$ | 210 | A |

EXAMPLES 13 through 16

The antistatic property-imparting polymer (T-3) obtained in Example 3 was incorporated in an amount of 1 to 30 parts into 100 parts of a methacrylic resin, and the mixture was pelletized by an extruder under the same conditions as described in Example 3. The obtained pellets were injection-molded into a plate 10 cm × 10 cm × 2 mm. After moisture conditioning was carried out at a temperature of 23° C. and a relative humidity of 65% for 1 day, the antistatic property and other properties were evaluated. The results are shown in Table 3.

TABLE 3

| Example No. | Amount of antistatic property-imparting polymer (T-3) (parts) | Surface resistance (Ω) | Charge half life (seconds) | Surface resistance (Ω) after water-washing treatment (Ω) | HDT (°C.) | Tensile modulus (kg/cm$^2$) | Tensile strength at break (kg/cm$^2$) | Surface condition | Haze (%) |
|---|---|---|---|---|---|---|---|---|---|
| 13 | 1 | $7.8 \times 10^{13}$ | 15.2 | $5.2 \times 10^{13}$ | 100 | $3.2 \times 10^4$ | 720 | A | <2 |
| 14 | 9 | $1.2 \times 10^9$ | <1 | $<10^9$ | 100 | $3.0 \times 10^4$ | 700 | A | 2 |
| 15 | 12 | $<10^9$ | <1 | $<10^9$ | 98 | $2.9 \times 10^4$ | 690 | A | 5 |
| 16 | 30 | $<10^9$ | <1 | $<10^9$ | 95 | $2.4 \times 10^4$ | 610 | A | 8 |

EXAMPLES 17 through 69

Various monomer solutions (M-2 through M-6) were prepared in the same manner as described in Example 1 by using amine-containing methacrylates or acrylates and quaternarizing agents shown in Table 4.

TABLE 4

| Monomer solution No. | Amine-containing methacrylate or acrylate | Quaternizing agent |
|---|---|---|
| M-2 | Diethylaminoethyl methacrylate | Diethyl sulfate |
| M-3 | Diethylaminoethyl methacrylate | Methyl p-toluene-sulfonate |
| M-4 | Diethylaminoethyl methacrylate | Methyl chloride |
| M-5 | Dimethylaminoethyl methacrylate | Dimethyl sulfate |
| M-6 | Diethylaminoethyl acrylate | Dimethyl sulfate |

Various antistatic property-imparting polymers (T-4 through T-44) were obtained in the same manner as described in Example 1 except that the above monomer solutions (M-2 through M-6) were used and the kinds and amounts of the monomers to be copolymerized were changed as shown in Table 5.

In Table 5, the following abbreviations are used.

E23MAM: polyethylene glycol(23) monomethacrylate monomethyl ether
E500MAM: polyethylene glycol(500) monomethacrylate monomethyl ether
E9MAM: polyethylene glycol(9) monomethacrylate monomethyl ether
E23AM: polyethylene glycol(23) monoacrylate monomethyl ether
P23MAM: polypropylene glycol(23) monomethacrylate monomethyl ether
E23MAS: polyethylene glycol(23) monomethacrylate monostearyl ether
B23MAM: polybutylene glycol(23) monomethacrylate monomethyl ether
PMMAMA: methacrylate-terminated polymethyl methacrylate(20) macromer
MMA: methyl methacrylate
BMA: n-butyl methacrylate

TABLE 5

| Antistatic property-imparting polymer | Quaternary ammonium base-containing monomer Kind | Copolymerization ratio (% by weight) | Copolymerizable monomer Kind | Copolymerization ratio (% by weight) |
|---|---|---|---|---|
| T-4 | M-2 | 100 | — | — |
| T-5 | M-3 | 100 | — | — |
| T-6 | M-4 | 100 | — | — |
| T-7 | M-5 | 100 | — | — |
| T-8 | M-6 | 100 | — | — |
| T-9 | M-2 | 80 | Styrene | 20 |
| T-10 | M-3 | 80 | Styrene | 20 |
| T-11 | M-4 | 80 | Styrene | 20 |
| T-12 | M-5 | 80 | Styrene | 20 |
| T-13 | M-6 | 80 | Styrene | 20 |
| T-14 | M-2 | 50 | E23MAM | 50 |
| T-15 | M-3 | 50 | E23MAM | 50 |
| T-16 | M-4 | 50 | E23MAM | 50 |
| T-17 | M-5 | 50 | E23MAM | 50 |
| T-18 | M-6 | 50 | E23MAM | 50 |
| T-19 | M-1 | 95 | Styrene | 5 |
| T-20 | M-1 | 60 | Styrene | 40 |
| T-21 | M-1 | 30 | Styrene | 70 |
| T-22 | M-1 | 80 | MMA | 20 |
| T-23 | M-1 | 80 | Acrylonitrile | 20 |
| T-24 | M-1 | 80 | Vinyl chloride | 20 |
| T-25 | M-1 | 80 | Styrene Acrylonitrile | 10 10 |
| T-26 | M-1 | 50 | E500MAM | 50 |
| T-27 | M-1 | 50 | E9MAM | 50 |
| T-28 | M-1 | 50 | E23AM | 50 |
| T-29 | M-1 | 50 | P23MAM | 50 |
| T-30 | M-1 | 50 | B23MAM | 50 |
| T-31 | M-1 | 50 | E23MAS | 50 |
| T-32 | M-1 | 20 | E23MAM | 80 |
| T-33 | M-1 | 30 | E23MAM | 70 |
| T-34 | M-1 | 40 | E23MAM | 60 |
| T-35 | M-1 | 60 | E23MAM | 40 |
| T-36 | M-1 | 80 | E23MAM | 20 |
| T-37 | M-1 | 95 | E23MAM | 5 |
| T-38 | M-1 | 40 | E23MAM MMA | 50 10 |
| T-39 | M-1 | 40 | E23MAM MMA | 30 30 |
| T-40 | M-1 | 20 | E23MAM MMA | 10 70 |
| T-41 | M-1 | 40 | E23MAM PMMAMA | 50 10 |
| T-42 | M-1 | 40 | E23MAM BMA | 50 10 |
| T-43 | M-1 | 40 | E23MAM E9MAM | 30 30 |
| T-44 | M-1 | 50 | MMA | 50 |

The so-obtained antistatic property-imparting polymers were incorporated into thermoplastic resins shown in Table 6 in amounts (parts per 100 parts by weight of the thermoplastic resin) shown in Table 6. Each mixture was pelletized by an extruder under the same conditions as described in Example 1 and injection-molded into a plate 10 cm×10 cm×2 mm. After moisture conditioning was carried out at a temperature of 23° C. and a relative humidity of 65% for 1 day, the antistatic property and other properties were evaluated. With respect to PMMA, the transparency was also determined. The results are shown in Table 6.

The following abbreviations are used in Table 6 (each abbreviation has the same meaning hereinafter):

PSt: polystyrene
PAS: styrene-acrylonitrile copolymer
PVC: polyvinyl chloride
ABS: ABS resin
PMMA: methacrylic resin.

TABLE 6

| Example | Thermoplastic resin | Antistatic property-imparting polymer Kind | Amount (parts) | Surface resistance (Ω) | Charge half life (seconds) | Surface resistance after water-washing treatment (Ω) | HDT (°C.) | Tensile elastic modulus (kg/cm²) | Tensile strength at break (kg/cm²) | Surface condition | Haze (%) |
|---|---|---|---|---|---|---|---|---|---|---|---|
| 17 | PSt | T-4 | 2 | $7.3 \times 10^{11}$ | 1.2 | $5.7 \times 10^{11}$ | 92 | $2.7 \times 10^4$ | 360 | A | |
| 18 | PSt | T-5 | 2 | $9.2 \times 10^{11}$ | 1.7 | $7.2 \times 10^{11}$ | 92 | $2.7 \times 10^4$ | 360 | A | |

TABLE 6-continued

| Example | Thermoplastic resin | Antistatic property-imparting polymer Kind | Antistatic property-imparting polymer Amount (parts) | Surface resistance (Ω) | Charge half life (seconds) | Surface resistance after water-washing treatment (Ω) | HDT (°C.) | Tensile elastic modulus (kg/cm²) | Tensile strength at break (kg/cm²) | Surface condtion | Haze (%) |
|---|---|---|---|---|---|---|---|---|---|---|---|
| 19 | PSt | T-6 | 2 | $2.4 \times 10^{12}$ | 2.7 | $9.3 \times 10^{11}$ | 92 | $2.7 \times 10^4$ | 360 | B | |
| 20 | PSt | T-7 | 2 | $3.7 \times 10^{11}$ | 1.2 | $1.3 \times 10^{11}$ | 92 | $2.7 \times 10^4$ | 360 | A | |
| 21 | PSt | T-8 | 2 | $2.8 \times 10^{11}$ | 1.2 | $1.2 \times 10^{11}$ | 92 | $2.7 \times 10^4$ | 360 | A | |
| 22 | PSt | T-9 | 5 | $6.4 \times 10^{11}$ | 1.3 | $3.3 \times 10^{11}$ | 92 | $3.1 \times 10^4$ | 430 | A | |
| 23 | PSt | T-10 | 5 | $6.6 \times 10^{11}$ | 1.3 | $4.1 \times 10^{11}$ | 92 | $3.1 \times 10^4$ | 430 | A | |
| 24 | PSt | T-11 | 5 | $8.2 \times 10^{11}$ | 1.5 | $5.9 \times 10^{11}$ | 92 | $3.1 \times 10^4$ | 430 | B | |
| 25 | PSt | T-12 | 5 | $2.5 \times 10^{11}$ | 1.2 | $1.2 \times 10^{11}$ | 92 | $3.1 \times 10^4$ | 430 | A | |
| 26 | PSt | T-13 | 5 | $2.9 \times 10^{11}$ | 1.2 | $1.1 \times 10^{11}$ | 92 | $3.1 \times 10^4$ | 430 | A | |
| 27 | PSt | T-19 | 5 | $2.4 \times 10^{10}$ | <1 | $5.3 \times 10^{9}$ | 92 | $2.9 \times 10^4$ | 410 | A | |
| 28 | PSt | T-20 | 5 | $2.1 \times 10^{12}$ | 7.5 | $9.8 \times 10^{11}$ | 92 | $3.3 \times 10^4$ | 450 | A | |
| 29 | PSt | T-21 | 5 | $7.8 \times 10^{13}$ | 12.3 | $5.3 \times 10^{13}$ | 92 | $3.4 \times 10^4$ | 480 | A | |
| 30 | PSt | T-36 | 5 | $4.8 \times 10^{10}$ | 1.1 | $2.3 \times 10^{10}$ | 92 | $3.0 \times 10^4$ | 420 | A | |
| 31 | PAS | T-1 | 2 | $5.2 \times 10^{11}$ | 1.2 | $2.3 \times 10^{11}$ | 100 | $3.1 \times 10^4$ | 600 | A | |
| 32 | PAS | T-2 | 5 | $5.8 \times 10^{11}$ | 1.2 | $4.1 \times 10^{11}$ | 100 | $3.6 \times 10^4$ | 740 | A | |
| 33 | PAS | T-23 | 5 | $2.3 \times 10^{11}$ | 1.2 | $9.8 \times 10^{10}$ | 100 | $3.6 \times 10^4$ | 740 | A | |
| 34 | PAS | T-25 | 5 | $4.2 \times 10^{11}$ | 1.2 | $2.3 \times 10^{11}$ | 100 | $3.6 \times 10^4$ | 740 | A | |
| 35 | PAS | T-22 | 5 | $1.7 \times 10^{11}$ | 1.2 | $9.7 \times 10^{10}$ | 100 | $3.6 \times 10^4$ | 740 | A | |
| 36 | PAS | T-3 | 6 | $5.3 \times 10^{10}$ | 1.1 | $4.5 \times 10^{10}$ | 100 | $3.1 \times 10^4$ | 710 | A | |
| 37 | PVC | T-1 | 2 | $1.2 \times 10^{12}$ | 2 | $8.7 \times 10^{11}$ | 75 | $2.9 \times 10^4$ | 410 | A | |
| 38 | PVC | T-22 | 5 | $7.6 \times 10^{11}$ | 1.3 | $5.6 \times 10^{11}$ | 72 | $3.4 \times 10^4$ | 500 | A | |
| 39 | PVC | T-24 | 5 | $8.4 \times 10^{11}$ | 1.3 | $6.2 \times 10^{11}$ | 72 | $3.5 \times 10^4$ | 500 | A | |
| 40 | PVC | T-3 | 6 | $2.4 \times 10^{10}$ | <1 | $1.2 \times 10^{10}$ | 71 | $2.9 \times 10^4$ | 480 | A | |
| 41 | ABS | T-1 | 2 | $1.3 \times 10^{11}$ | 1.2 | $9.8 \times 10^{10}$ | 99 | $1.8 \times 10^4$ | 320 | A | |
| 42 | ABS | T-2 | 5 | $4.7 \times 10^{11}$ | 1.2 | $2.2 \times 10^{11}$ | 100 | $2.2 \times 10^4$ | 380 | A | |
| 43 | ABS | T-3 | 6 | $2.4 \times 10^{10}$ | 1.1 | $2.1 \times 10^{10}$ | 99 | $2.1 \times 10^4$ | 370 | A | |
| 44 | PMMA | T-1 | 2 | $3.2 \times 10^{11}$ | 1.2 | $1.2 \times 10^{11}$ | 100 | $2.8 \times 10^4$ | 640 | A | 25 |
| 45 | PMMA | T-22 | 4 | $4.4 \times 10^{12}$ | 2.2 | $2.4 \times 10^{12}$ | 100 | $3.0 \times 10^4$ | 700 | A | 20 |
| 46 | PMMA | T-44 | 6 | $5.8 \times 10^{11}$ | 1.3 | $2.3 \times 10^{11}$ | 100 | $3.0 \times 10^4$ | 700 | A | 8 |
| 47 | PMMA | T-14 | 6 | $3.2 \times 10^{10}$ | <1 | $1.3 \times 10^{10}$ | 100 | $3.1 \times 10^4$ | 710 | A | <2 |
| 48 | PMMA | T-15 | 6 | $2.8 \times 10^{11}$ | <1 | $9.4 \times 10^{10}$ | 100 | $3.1 \times 10^4$ | 710 | A | <2 |
| 49 | PMMA | T-16 | 6 | $4.2 \times 10^{11}$ | 1.2 | $1.2 \times 10^{11}$ | 100 | $3.1 \times 10^4$ | 710 | B | <2 |
| 50 | PMMA | T-17 | 6 | $1.2 \times 10^{10}$ | <1 | $8.2 \times 10^{9}$ | 100 | $3.1 \times 10^4$ | 710 | A | <2 |
| 51 | PMMA | T-18 | 6 | $2.4 \times 10^{10}$ | <1 | $1.1 \times 10^{10}$ | 100 | $3.1 \times 10^4$ | 710 | A | <2 |
| 52 | PMMA | T-26 | 6 | $1.1 \times 10^{10}$ | <1 | $7.9 \times 10^{9}$ | 100 | $3.1 \times 10^4$ | 710 | A | <2 |
| 53 | PMMA | T-27 | 6 | $3.5 \times 10^{10}$ | <1 | $1.2 \times 10^{10}$ | 100 | $3.1 \times 10^4$ | 710 | A | <2 |
| 54 | PMMA | T-28 | 6 | $1.8 \times 10^{10}$ | <1 | $9.5 \times 10^{9}$ | 100 | $3.1 \times 10^4$ | 710 | A | <2 |
| 55 | PMMA | T-29 | 6 | $2.4 \times 10^{10}$ | <1 | $9.8 \times 10^{9}$ | 100 | $3.1 \times 10^4$ | 710 | A | <2 |
| 56 | PMMA | T-30 | 6 | $7.5 \times 10^{10}$ | 1.2 | $6.3 \times 10^{10}$ | 100 | $3.1 \times 10^4$ | 710 | A | <2 |
| 57 | PMMA | T-31 | 6 | $2.1 \times 10^{11}$ | 1.5 | $1.0 \times 10^{11}$ | 100 | $3.1 \times 10^4$ | 710 | A | <2 |
| 58 | PMMA | T-32 | 20 | $5.3 \times 10^{12}$ | 3.2 | $2.3 \times 10^{12}$ | 100 | $2.7 \times 10^4$ | 630 | A | <2 |
| 59 | PMMA | T-33 | 12 | $1.2 \times 10^{12}$ | 3.1 | $8.7 \times 10^{11}$ | 100 | $2.9 \times 10^4$ | 660 | A | <2 |
| 60 | PMMA | T-34 | 6 | $6.5 \times 10^{11}$ | 1.2 | $2.3 \times 10^{11}$ | 100 | $3.1 \times 10^4$ | 710 | A | <2 |
| 61 | PMMA | T-35 | 6 | $1.2 \times 10^{10}$ | <1 | $8.7 \times 10^{9}$ | 100 | $3.1 \times 10^4$ | 710 | A | <2 |
| 62 | PMMA | T-36 | 6 | $5.4 \times 10^{9}$ | <1 | $2.3 \times 10^{9}$ | 100 | $3.1 \times 10^4$ | 710 | A | 8 |
| 63 | PMMA | T-37 | 6 | $8.7 \times 10^{10}$ | 1.3 | $5.3 \times 10^{10}$ | 100 | $2.8 \times 10^4$ | 650 | A | 28 |
| 64 | PMMA | T-38 | 6 | $6.8 \times 10^{11}$ | 2.0 | $3.2 \times 10^{11}$ | 100 | $3.1 \times 10^4$ | 710 | A | <2 |
| 65 | PMMA | T-39 | 6 | $7.6 \times 10^{11}$ | 1.8 | $4.1 \times 10^{11}$ | 100 | $3.1 \times 10^4$ | 710 | A | <2 |
| 66 | PMMA | T-40 | 20 | $4.8 \times 10^{12}$ | 3.2 | $3.2 \times 10^{12}$ | 100 | $3.1 \times 10^4$ | 710 | A | <2 |
| 67 | PMMA | T-41 | 6 | $4.5 \times 10^{11}$ | 1.3 | $2.1 \times 10^{11}$ | 100 | $3.1 \times 10^4$ | 710 | A | <2 |
| 68 | PMMA | T-42 | 6 | $5.4 \times 10^{11}$ | 1.3 | $3.2 \times 10^{11}$ | 100 | $3.1 \times 10^4$ | 710 | A | <2 |
| 69 | PMMA | T-43 | 6 | $5.8 \times 10^{11}$ | 1.3 | $2.0 \times 10^{11}$ | 100 | $3.1 \times 10^4$ | 710 | A | <2 |

EXAMPLE 70

To 100 parts of a methacrylic resin was added 6 parts of the antistatic property-imparting polymer(T-3) obtained in Example 3, and the mixture was pelletized by an extruder under the same conditions as described in Example 3 and extrusion-molded into a sheet having a thickness of 2 mm. Moisture conditioning was carried out at a temperature of 23° C. and a relative humidity of 65% for 1 day, and the antistatic property and other properties were evaluated. It was found that the surface resistance was $8.2 \times 10^{10}$ Ω, the charge half value was 1.5 seconds and the haze was less than 2%.

The obtained sheet was subjected to the water-washing treatment and the antistatic property was immediately measured. It was found that the surface resistance was $4.3 \times 10^{10}$ Ω and the charge half value was 1.5 seconds.

COMPARATIVE EXAMPLES 1 through 5

Properties of thermoplastic resins free of an antistatic property-imparting polymer were evaluated. Pelletizing and injection molding were carried out in the same manner as described in Example 1. The results are shown in Table 7.

TABLE 7

| Comparative Example No. | Thermoplastic resin | Surface resistance (Ω) | Charge half life (seconds) | Surface resistance (Ω) after water-washing treatment | HDT (°C.) | Tensile elastic modulus (kg/cm$^2$) | Tensile strength at break (kg/cm$^2$) | Surface condition |
|---|---|---|---|---|---|---|---|---|
| 1 | PSt | >10$^{15}$ | ∞ | >10$^{15}$ | 92 | 3.4 × 10$^4$ | 480 | A |
| 2 | PAS | >10$^{15}$ | ∞ | >10$^{15}$ | 100 | 3.7 × 10$^4$ | 750 | A |
| 3 | PVC | >10$^{15}$ | ∞ | >10$^{15}$ | 75 | 3.6 × 10$^4$ | 520 | A |
| 4 | PMMA | >10$^{15}$ | ∞ | >10$^{15}$ | 100 | 3.3 × 10$^4$ | 730 | A |
| 5 | ABS | >10$^{15}$ | ∞ | >10$^{15}$ | 99 | 2.2 × 10$^4$ | 410 | A |

COMPARATIVE EXAMPLE 6

To 100 parts of a methacrylic resin was added 50 parts of the antistatic property-imparting polymer(T-3) obtained in Example 3, and in the same manner as described in Example 3, the mixture was extruded and injection-molded to obtain a plate 10 cm×10 cm×2 mm. Moisture conditioning was carried out at a temperature of 23° C. and a relative humidity of 65% for 1 day, and the antistatic property and other properties were evaluated. The results are shown in Table 8.

TABLE 8

| Surface resistance (Ω) | Charge half life (seconds) | Surface resistance (Ω) after water-washing treatment | Haze (%) | Surface condition | Elastic modulus (kg/cm$^2$) | Tensile strength at break (kg/cm$^2$) | HDT (°C.) |
|---|---|---|---|---|---|---|---|
| <10$^9$ | <1 | <10$^9$ | 25 | B | 1.9 × 10$^4$ | 530 | 87 |

As is readily understood from the results shown in Table 8, if the amount of the antistatic property imparting polymer added is 50 parts per 100 parts of the methacrylic resin, the haze is increased and the transparency is lost though the antistatic property is good. Moreover, the mechanical properties are degraded.

COMPARATIVE EXAMPLES 7 and 8

Antistatic property-imparting polymers(T-45) and (T-46) having a composition shown in Table 9 were prepared by using the quaternary ammonium base-containing monomer (M-1) in the same manner as described in Example 3.

TABLE 9

| Antistatic polymer | Quarternary ammonium base-containing monomer Kind | Amount (parts) | Polyalkylene glycol monomers Kind | Amount (parts) | Copolymerizable monomer Kind | Amount (parts) |
|---|---|---|---|---|---|---|
| T-45 | M-1 | 10 | E23MAM | 90 | — | — |
| T-46 | M-1 | 10 | E23MAM | 10 | MMA | 80 |

The antistatic property-imparting polymer shown in Table 9 was incorporated into a methacrylic resin in an amount shown in Table 10 per 100 parts of the methacrylic resin. In the same manner as described in Example 3, the mixture was pelletized by an extruder and injection-molded into a plate 10 cm×10 cm×2 mm. Moisture conditioning was carried out at a temperature of 23° C. and a relative humidity of 65% for 1 day, and the antistatic property and transparency were evaluated. The results are shown in Table 10. In the antistatic polymer used in Comparative Example 7 or 8, the content of the quaternary ammonium base-containing monomer was too low, and the antistatic effect could not be manifested even if the amount of the antistatic property-imparting polymer added was increased.

TABLE 10

| Comparative Example No. | Antistatic polymer Kind | Amount added (parts) | Surface resistance (Ω) | Charge half life (seconds) | Surface resistance after water-washing treatment (Ω) | Haze (%) |
|---|---|---|---|---|---|---|
| 7 | T-45 | 30 | 6.8 × 10$^{14}$ | ∞ | 5.4 × 10$^{14}$ | <2 |
| 8 | T-46 | 30 | 3.8 × 10$^{14}$ | ∞ | 3.4 × 10$^{14}$ | <2 |

COMPARATIVE EXAMPLE 9

To 100 parts of a polystyrene was added 10 parts of glycerol monostearate (low-molecular-weight surface active agent), and the mixture was pelletized by a melt extruder.

The obtained pellets were injection-molded into a plate of 10 cm×10 cm×2 mm. After moisture conditioning, the antistatic property was evaluated. It was found that the surface resistance was 5.3×10$^{12}$ Ω and the charge half life was 3.5 seconds.

The obtained plate was subjected to the water-washing treatment and the antistatic property was immediately evaluated. It was found that the surface resistance was 6.4×10$^{15}$ Ω and the charge half life was longer than 2 minutes.

The HDT was measured and was found to be 68° C. The tensile test was carried out and it was found that the tensile elastic modulus was 2.5×10$^4$ kg/cm$^2$ and the tensile strength at break was 300 kg/cm$^2$.

COMPARATIVE EXAMPLE 10

A polystyrene molded plate of 10 cm×10 cm×2 mm was immersed for 1 minute in a 1.5% aqueous solution of a coating type antistatic agent having a quaternary ammonium base (Staticide, tradename, supplied by Analytical Chemical Laboratories), and the plate was air-dried. Moisture conditioning was carried out at a temperature of 23° C. and a relative humidity of 65% for 1 day and the antistatic property was evaluated. It was found that the surface resistance was $1.3 \times 10^{10}$ Ω and the charge half life was 1.5 seconds.

The obtained plate was subjected to the water-washing treatment and the antistatic property was evaluated. It was found that the surface resistance value was $15.8 \times 10^{15}$ Ω and the charge half life was longer than 2 minutes. It was confirmed that the plate lacked the permanent antistatic property.

COMPARATIVE EXAMPLE 11

To 100 parts of a methacrylic resin was added 10 parts of glycerol monostearate (low-molecular-weight surface active agent), and the mixture was pelletized by an extruder.

The obtained pellets were injection-molded into a plate 10 cm×10 cm×2 mm under the same conditions as described in Example 3. Moisture conditioning was carried out at a temperature of 23° C. and a relative humidity of 65% for 1 day, and the antistatic property was evaluated. It was found that the surface resistance was $8.0 \times 10^{11}$ Ω and the charge half life was 3.5 seconds.

The obtained plate was subjected to the water-washing treatment. I was found that the surface resistance was $1.5 \times 10^{15}$ Ω and the charge half life was longer than 1 minute. It was confirmed that the antistatic property of the resin composition of this comparative example had no water-washing resistance.

The HDT was measured and was found to be 71° C. The tensile test was carried out and it was found that the tensile elastic modulus was $2.5 \times 10^4$ kg/cm² and the tensile strength at break was 470 kg/cm².

COMPARATIVE EXAMPLE 12

A methacrylic resin plate of 10 cm×10 cm×2 mm was immersed for 1 minute in a 1.5% aqueous solution of a coating type antistatic agent having a quaternary ammonium base (Staticide, tradename, supplied by Analytical Chemical Laboratories) and air-dried. Moisture conditioning was carried out at a temperature of 23° C. and a relative humidity of 65% for 1 day, and the antistatic property was evaluated. It was found that the surface resistance was $1.3 \times 10^9$ Ω and the charge half life was shorter than 1 second.

The obtained plate was subjected to the water-washing treatment and the antistatic property was immediately evaluated. It was found that the surface resistance was $5.8 \times 10^{15}$ Ω and the charge half life was longer than 2 minutes. It was confirmed that the plate lacked the permanent antistatic property.

We claim:

1. An antistatic thermoplastic resin composition which comprises (A) 100 parts by weight of methyl methacrylate polymer readily electrically charged by friction comprising at least 50% by weight of methyl methacrylate units and (B) 0.1 to 20 parts by weight of an antistatic property-imparting copolymer comprising at least 20% by weight of units of a monomer having a quaternary ammonium base, which is represented by the following general formula (I):

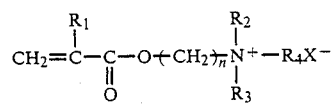

wherein $R_1$ represents a hydrogen atom or a methyl group, $R_2$ through $R_4$ represent a hydrogen atom or an alkyl group having 1 to 9 carbon atoms, which may have a substituent, n is a number of from 1 to 10, and $X^-$ represents a monovalent inorganic or organic acid group or a corresponding equivalent of an inorganic or organic acid, at least 10% by weight of units of a copolymerizable monomer having a polyalkylene glycol component and 0 to 70% by weight of units of other copolymerizable vinyl monomer or vinylidene monomer, the weight ratio of units of the monomer having a quaternary ammonium base represented by the general formula (I), to units of the copolymerizable monomer having a polyalkylene glycol component being from $\frac{1}{4}$ to 2/1, the units of the other copolymerizable vinyl monomer or vinylidene monomer being units of methyl methacrylate or units of a monomer which does not cause a diminution of transparency of the thermoplastic resin composition relative to a composition in which the other copolymerizable vinyl monomer or vinylidene monomer of (B) is methyl methacrylate.

2. An antistatic thermoplastic resin composition as set forth in claim 1, wherein the counter anion $X^-$ of the quaternary ammonium base in the general formula (I) is $RSO_3^-$ or $ROSO_3^-$ in which R represents a hydrogen atom or an alkyl group having 1 to 20 carbon atoms, which may have a phenyl group.

3. An antistatic thermoplastic resin composition as set forth in claim 1, wherein the copolymerizable monomer having a polyalkylene glycol component is a monomer represented by the following general (II):

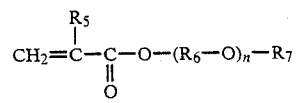

wherein $R_5$ represents a hydrogen atom or a methyl group, $R_6$ represents for an alkylene group having up to 4 carbon atoms, which may be branched, $R_7$ represents a hydrogen atom or an alkyl group having 1 to 20 carbon atoms, and n is an integer of from 1 to 500.

4. An antistatic thermoplastic resin composition as set forth in claim 3, wherein units of the copolymerizable vinyl monomer or vinylidene monomer are units of methyl methacrylate.

5. An antistatic thermoplastic resin composition as set forth in claim 3, wherein the weight ratio of units of the monomer having a quaternary ammonium base, represented by the general formula (I), to units of the copolymerizable monomer having a polyalkylene glycol component, which is represented by the general formula (II), in the polymer (B) is from $\frac{1}{4}$ to 2/1.

6. An antistatic thermoplastic resin composition as set forth in claim 1, wherein the methyl methacrylate polymer (A) is mixed wit the polymer (B) in the molten state.

7. An antistatic thermoplastic resin composition as set forth in claim 1, wherein the average molecular weight of the polymer (B) is at least 1,000.

8. An antistatic thermoplastic resin composition as set forth in claim 1, which further comprises a phosphite antioxidant.

* * * * *